United States Patent [19]
Braig et al.

[11] Patent Number: 5,877,500
[45] Date of Patent: Mar. 2, 1999

[54] MULTICHANNEL INFRARED DETECTOR WITH OPTICAL CONCENTRATORS FOR EACH CHANNEL

[75] Inventors: James R. Braig, Alameda; Arthur M. Shulenberger, Brisbane, both of Calif.

[73] Assignee: Optiscan Biomedical Corporation, Alameda, Calif.

[21] Appl. No.: 816,088

[22] Filed: Mar. 13, 1997

[51] Int. Cl.[6] .................................................... G01J 5/02
[52] U.S. Cl. ........................................... 250/353; 250/332
[58] Field of Search .................................. 250/353, 342, 250/347, 332

[56] References Cited

U.S. PATENT DOCUMENTS

| | | | |
|---|---|---|---|
| 4,153,955 | 5/1979 | Hinterberger | 4/172 |
| 4,754,139 | 6/1988 | Ennulate et al. | 250/332 |
| 5,089,055 | 2/1992 | Nakamura | 136/248 |
| 5,282,473 | 2/1994 | Braig et al. | 250/343 |
| 5,422,475 | 6/1995 | Norton | 250/332 |

Primary Examiner—Edward P. Westin
Assistant Examiner—Richard Hanig
Attorney, Agent, or Firm—Sawyer & Associates

[57] ABSTRACT

The present invention comprises a system and method for detecting multiple wavelength bands of infrared radiation. The present invention incorporates an optical concentrator or "optical funnel" to increase the energy density on the detection elements and discrete filters mounted in the funnels and a mounting structure for individual detector elements. An apparatus in accordance with the present invention is an advance over conventional infrared detector assemblies in several areas. The apparatus in accordance with the present invention provides a unified means for mounting detectors, optical concentrators and infrared filters. It also provides an efficient means for electrical connection to the detector elements. The present invention provides a mounting structure for the detectors bonding them directly to the body of the optical funnel and passing light into them from the "backside" of the detector elements. The present invention prevents cross talk by mounting the detector elements at the focused end of individual optical concentrators.

15 Claims, 3 Drawing Sheets

MULTICHANNEL INFRARED DETECTOR WITH OPTICAL CONCENTRATORS FOR EACH CHANNEL

FIELD OF THE INVENTION

The present invention relates generally to an infrared detector system and more particularly to an infrared detector system that utilizes optical concentration to improve signal to noise ratios.

BACKGROUND OF THE INVENTION

Optical detectors are utilized to detect infrared energy emanating from an object. Typically, one-dimensional or two-dimensional planar arrays of these optical detectors are utilized to detect this energy. Typically, the area receiving the signal must be increased or maximized to insure that the array receives an adequate amount of the signal.

FIG. 1 shows an example of a conventional detector array 10 with four detectors 12. In this type of detector array 10, the detectors 12 are of maximum size while the gap 14 between the detector is minimized. Conventional art also discloses a separate mounting structure for the detectors because of their need for electrical insulation, interconnection, isothermal substrate and clear optical aperture on the front surface.

Typical prior art includes multichannel detector arrays without optical concentration means, and; single channel detectors with optical concentration means. The combination of an array of optical concentrator means with an array of detector elements is not typical in the prior art.

Also, multichannel detector arrays with individual filter elements have typically suffered from optical crosstalk due to optical scattering within the common space between the filter array and the detector array.

Accordingly, what is needed is a method and system for overcoming the cross-talk problems associated with conventional detectors while at the same time allowing for maximum detection of infrared energy. The method and system should be easily implemented utilizing existing manufacturing techniques. In addition, it should be cost effective and readily adaptable to existing devices.

The present invention addresses such a need.

SUMMARY OF THE INVENTION

It is an object of the invention to provide multiple infrared detector channels in a unitary package. It is a further object to reduce detector noise by reducing detector area. It is a further object to maximize the energy absorbed by and the signal generated by each detector element. It is another object to minimize or eliminate optical crosstalk between detector elements. Finally, it is an object to minimize temperature differences between detector elements, and minimize cool-down or temperature stabilization time.

The present invention is a system and method for detecting multiple wavelength bands of infrared radiation. The present invention incorporates an optical concentrator or "optical funnel" to increase the energy density on the detection elements and discrete filters mounted in the funnels and a mounting structure for individual detector elements.

An apparatus in accordance with the present invention is an advance over conventional infrared detector assemblies in several areas. The apparatus in accordance with the present invention provides a unified means for mounting detectors, optical concentrators and infrared filters. It also provides an efficient means for electrical connection to the detector elements.

The present invention provides a mounting structure for the detectors bonding them directly to the body of the optical funnel and passing light into them from the "backside" of the detector elements. The present invention prevents cross talk by mounting the detector elements at the focused end of individual optical concentrators.

DESCRIPTION OF THE INVENTION

The present invention relates to an improvement in an infrared detector system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
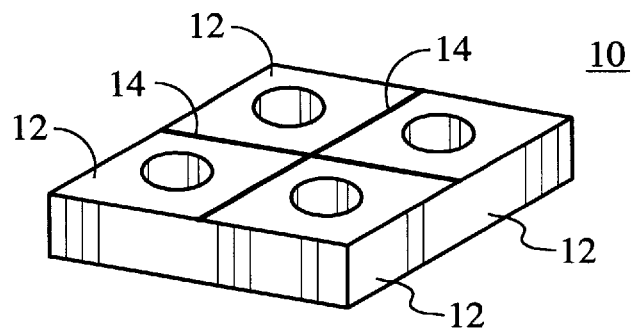
FIG. 1 shows an example of a conventional focal array with four detectors.
Figure 2:
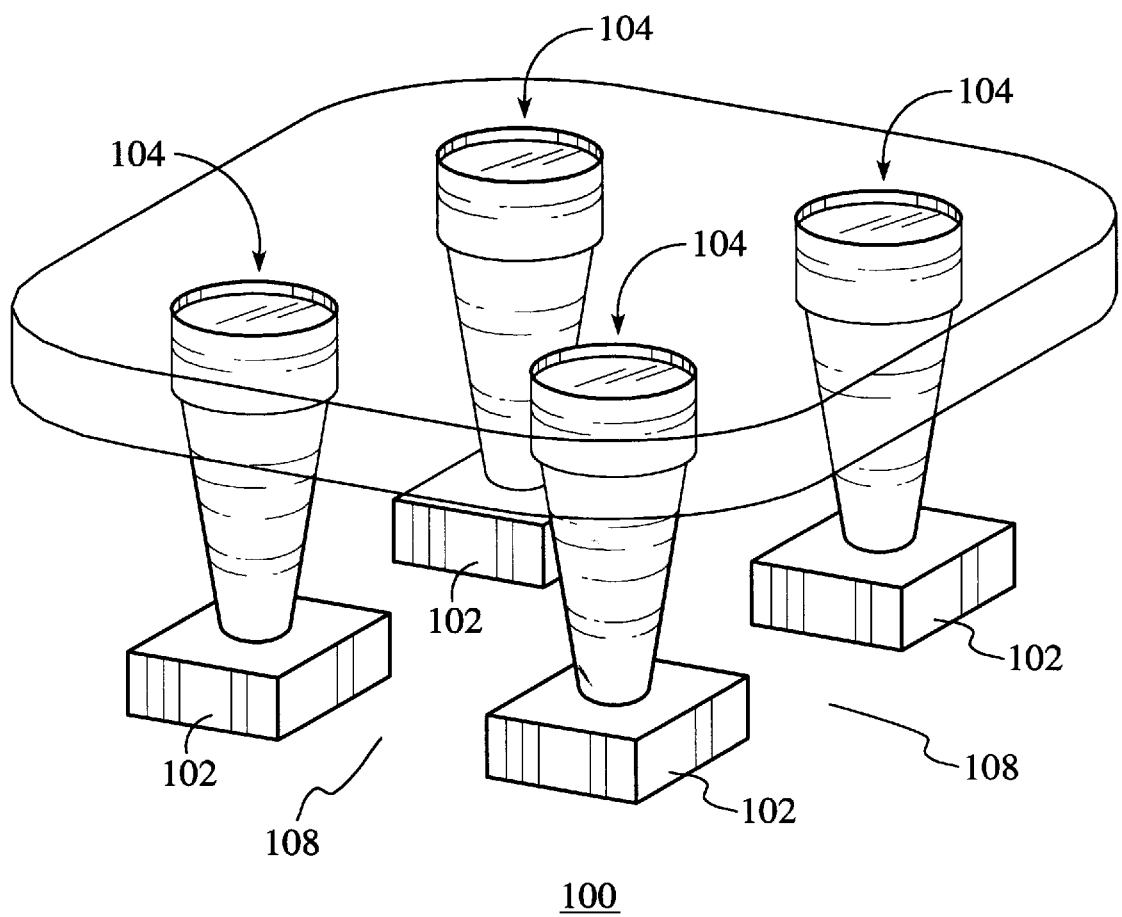
FIG. 2 is a perspective view of a multichannel focal array in accordance with the present invention.

FIG. 2 is a perspective view of a multichannel focal array 100 in accordance with the present invention. The focal array 100 includes a plurality of detectors 102, each of which is associated with an optical concentrator assembly 104. Each of the concentrators 104 being shaped like a funnel, such that the one end top is a maximum diameter and the other end (bottom) is a minimum diameter. Accordingly, a focal array in accordance with the present invention has a minimization size detector 102 with a maximum size gap 108 between the detectors. This in effect contrasts to the conventional focal array of FIG. 1 in which the detector size is maximized and the gap is minimized. Accordingly, with an optical focal array in accordance with the present invention, optical cross-talk between channels is substantially reduced.

Detector noise is proportional to the square root of the area of the detector and the detector signal is proportional to the energy absorbed by the detector. Filtering, imaging and dispersive optical systems transmit optical energy through a limited numerical aperture or angle relative to an optical axis. Accordingly, use of the optical concentrator such as a tapered light pipe or funnel, as shown, can increase energy density per unit area. Through the present invention, optical concentrators can be utilized so that the apparent size of the detector can be increased without increasing the noise. Below-mentioned are typical types of detectors which can be used in this particular application and the characteristics associated therewith.

Figure 3:
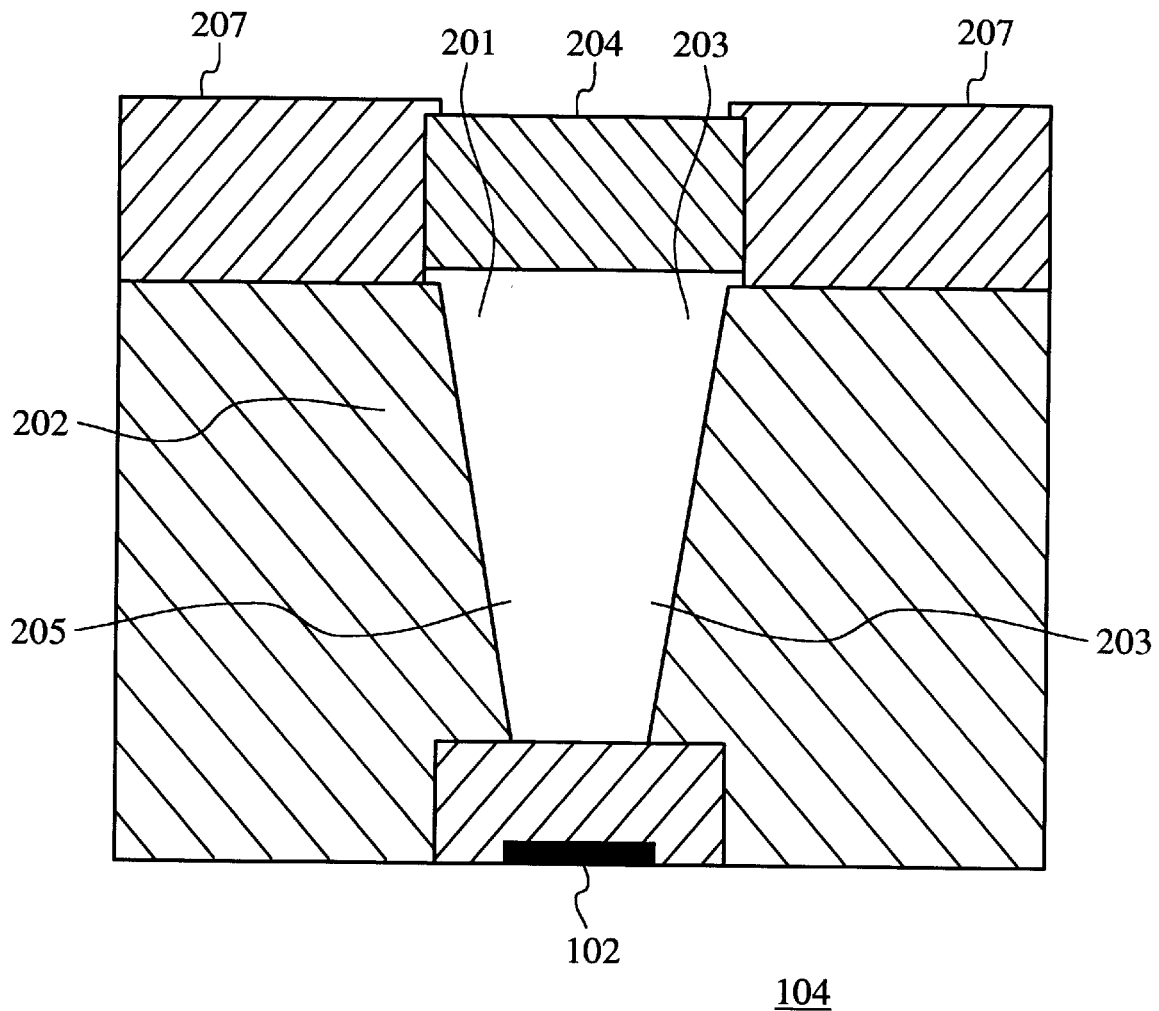
FIG. 3 is a cross sectional view of the optical concentrator assembly in accordance with the present invention.

FIG. 3 is a cross sectional view of the optical concentrator assembly 104 in accordance with the present invention. At the opening 201 at the larger end 203 of the funnel 202 the bandpass filter 204 is mounted which selects the wavelength of infrared energy allowed to enter the concentrator assembly. At the smaller end 203 of the funnel the detector 102 is mounted. The funnel 202 concentrates the energy entering the larger opening 203 (for example, 0.082" diameter) down to the smaller opening 205 (for example, 0.040" diameter) before the energy falls on the detector 102.

Figure 4A:
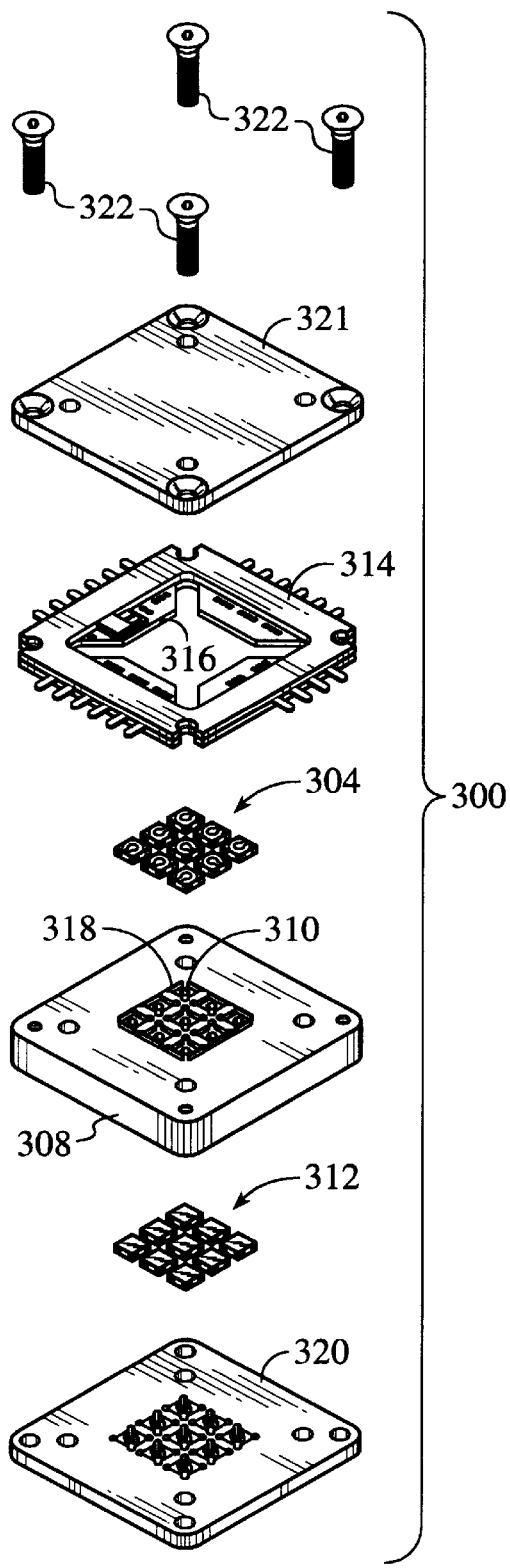
FIGS. 4*a* and 4*b* show a top exploded view and a bottom exploded view of an optical detector assembly in accordance with the present invention.
Figure 4B:
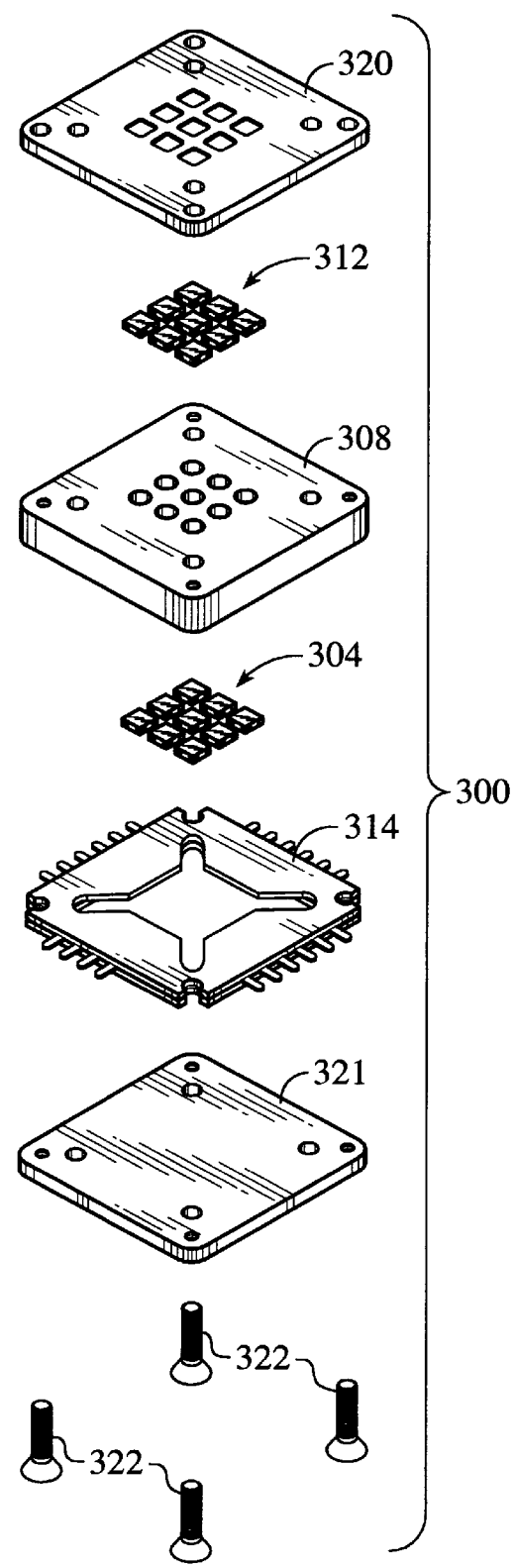

FIGS. 4a and 4b show a top exploded view and a bottom exploded view of an optical detector assembly 300 in accordance with the present invention. Detectors 304 are mounted into one side of a detector mounting plate 308 which contain the optical concentrator 310. The plurality of filters 312 are positioned against the concentrator array 310 and mounted within a filter mounting plate 320. The assembly is secured by cover plate 321 via screws 322. Lead frame assembly 314 mounts on top of the detectors 304 and conventional bonding wires 316 connect each detector 304 to the conductors in the lead frame.

In a preferred embodiment each channel has its own filter 312. The optical concentrators are integrated into a single component, an optical concentrator array 310 inside the detector mounting plate 308, that also provides a means for mounting the detector. This type of detector array can be used for a variety of applications such as multichannel spectroscopy which could be either filtered or dispersive or, for example, in focal plane arrays which are used for imaging.

The various portions of the optical detector assembly 300 in accordance with the present invention which will be described in detail below.

Detectors 304

A. Cryogenic detectors

In a preferred embodiment, photon energy frees charge carriers for electrical measurement of signal. The detector can be mounted as a "flip chip" where radiation enters from the substrate side. In one example, A/R coating can be applied to minimize surface reflection losses. Spherical optical surface can provide "optical immersion" to increase effective collection area without increasing detector noise area. In addition, the back side can be metalized to block unwanted optical paths.

B. Thermal detector such as bolometer

In this embodiment, blackened, energy absorbing area converts photon energy to heat. Therefore, change in temperature or thermal load is utilized to generate signal.

Detector mounting plate 308

Optical concentrator array 310

In a preferred embodiment, the array 310 is integrated into the mounting plate 308 and comprises a solid piece of low expansion alloy such as kovar. Each channel has a pocket for mounting the/a detector element. The shoulder of pocket blocks optical crosstalk. There are corner reliefs for adhesive and dimple recesses for indium balls. The optical concentrator, large end towards filter, small end towards detector, has a polished and gold plated surface for high reflectivity and can have rectangular cross section. The optical concentrator can have a complex curve profile.

Filter array assembly

The filter array 312 is coupled to a filter mounting plate 320. The filter mounting plate 320 has individual pockets for each filter. In a preferred embodiment, corners of pockets are relieved for glue placement. Furthermore, the assembly could be made to be interchangeable for different filter sets. Finally, the filter mounting plate 320 should be made of low expansion alloy such as kovar and can be fabricated by electroforming.

In a preferred embodiment, the location of the filter array over the large end of the optical concentrator places the filters in a location in the optical path where the light is more collimated (as opposed to the small end). It is known that infrared interference filters will perform with a tighter bandwidth and a more accurate center wavelength with more collimated light rays incident on the filter. Thus the use of the optical concentrator allows filter placement at the large opening where very few off axis rays exist while still making use of the full field of view of the detector by placing the detectors opposite the small opening of the concentrator where many wide angle rays exist.

Lead frame package 314

The sandwich material for the lead frame package can be a variety of materials such as beryllia. The material should have high thermal conductivity and electrical insulation. Lead frame package in a preferred embodiment is gold plated copper, brazed to patterned beryllia substrate. In a preferred embodiment, beryllia spacer and temperature sensor can be glued to a patterned substrate.

In a preferred embodiment, as before mentioned the detectors 304 are mounted into pockets 318 in the optical concentrator array 310. Electrical connections are made by wire bonding from detector pads to pattern on beryllia substrate. The lead frame package 314 is assembled between the optical concentrator array 309 and cover plate 321. The cover plate 321 is secured to via screws 322.

The use of copper in manufacture of the conductors of the lead frame is critical to the elimination of unwanted thermocouples and thermal electrom . . . fields (EMFs). Typically the detectors 304 are maintained at cyrogenic temperatures by physically mounting the detector assembly to a cyrogenic "cold finger". Small bonding wires electrically connect the detectors 304 to the lead frame. Because of their proximity to the detectors 304, these bonding wires as well as parts of the lead frame package 314 are also at cyrogenic temperatures. The distal end of the lead frame package 314 is connected to larger wires that take the signal to preamplifiers (not shown). The preamplifiers are typically at normal room temperatures while being located outside of the cyrogenic environment. Because of their relatively large size (28 AWG) the wires between the pre-amplifiers and the lead frame package 314 conduct substantial heat to the lead frame and produce a temperature gradient across it from room temperature to cyrogenic temperatures. When copper is used for the lead frame package 314 and the interconnection wires, the generation of thermocouples or thermal EMF (contact of dissimilar metals with a temperature differential) is avoided. If copper is not used in the lead frame (KOVAR is a material of standard practice) then a thermal EMF is generated where the copper wire bonds to the lead frame material. Because of the relatively high temperature differentials involved (cyrogenic to room temperature) a significant EMF in the 100s of microvolts can be generated swamping out typical photoelectric signals from the detectors.

Thus, a system and method in accordance with the present invention accomplishes two desirable design goals:

1. Provide for relatively few wide angle rays passing through the IR filter to optimize filter performance.
2. Provide a wide field of view with many wide angle rays incident on the detector to optimize the amount of energy collected by the detector.

Although the present invention has been described in accordance with the embodiments shown, one of ordinary skill in the art will readily recognize that there could be variations to those embodiments and those variations would be within the spirit and scope of the present invention. Accordingly, many modifications may be made by one of ordinary skill in the art without departing from the spirit and scope of the appended claims.

What is claimed is:

1. An optical detector array assembly comprising:

a plurality of multiple detectors; and at least one concentrator means associated with one of the detectors, the detector being located in a pocket of the at least one concentrator means, the size of one of the detectors being minimized and a gap between the one of the detectors and other detectors in the plurality of multiple detectors being maximized by the at least one concentrator means.

2. The assembly of claim 1 wherein the at least one concentrator means further comprises:

a holding means which includes the pocket for holding the detector means; and a concentrator coupled to the holding means.

3. The assembly of claim 2 wherein the at least one concentrator means comprises a funnel-like shape in which includes a small opening at one end and a large opening at an opposite end, the detector being positioned within the small opening.

4. The assembly of claim 2 wherein in the concentrator includes a filter means.

5. The assembly of claim 3 wherein the filter is removable.

6. The assembly of claim 1 including a concentrator means associated with each of the plurality of detectors.

7. An optical detector array assembly comprising:

a plurality of detectors; and a plurality of concentrator means associated with the plurality of detectors, the plurality of detectors being located in pockets of the plurality of concentrator means, the size of the plurality of detectors being minimized and gaps between the detectors being maximized by the plurality of concentrator means.

8. The assembly of claim 7 wherein the at least one concentrator means further comprises:

a holding means which includes the pocket for holding the detector means; and a concentrator coupled to the holding means.

9. The assembly claimed 8 wherein each of the plurality of concentrator means comprises a funnel-like shape in which includes a small opening at one end and a large opening at an opposite end, a detector been positioned within the small opening.

10. The assembly of claim 9 wherein in the concentrator includes a filter means.

11. The assembly of claim 9 wherein the filter is removable.

12. The assembly of claim 7 including a concentrator means associated with each of the plurality of detectors.

13. An optical detector array assembly comprising:

a detector mounting plate;

a plurality of detectors coupled to one side of the detector mounting plate;

an optical concentrator array coupled to an opposite side of the detector mounting plate, the optical concentrator array comprising a plurality of funnel shaped members each of the plurality of funnel shaped members including a small opening at one end and a large opening at an opposite end, the plurality of detectors being positioned within a plurality of pockets at the small openings of the plurality of funnel shaped members, the size of the plurality of detectors being minimized and the gaps between the plurality of detectors being maximized by the optical concentrator array.

14. The optical array assembly of claim 13 which includes a plurality of filters, the plurality of filters being positioned at the large opening of the funnel shaped members and a filter mounting plate for holding the plurality of filters.

15. The optical array assembly of claim 13 which includes a lead frame member coupled to the plurality of detectors, the conductors of the lead frame assembly being composed substantially of copper.

* * * * *